Oct. 27, 1970  W. R. SMITH-VANIZ  3,536,374
ELECTROMECHANICAL VARIABLE BIREFRINGENT LIGHT VALVE
Filed July 18, 1966  2 Sheets-Sheet 1
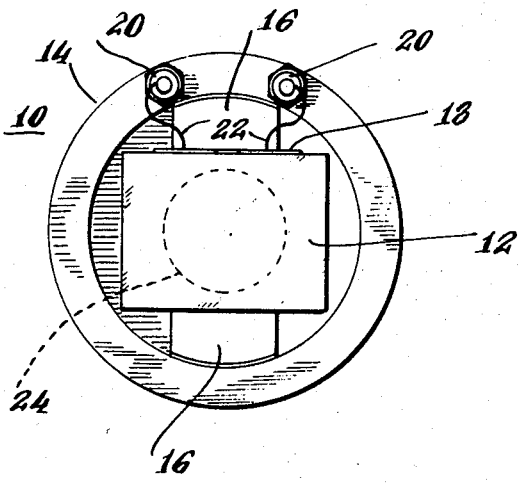
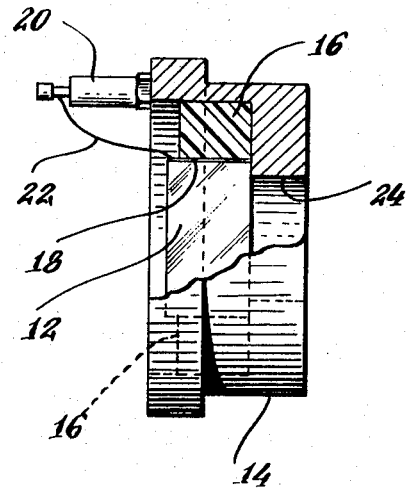
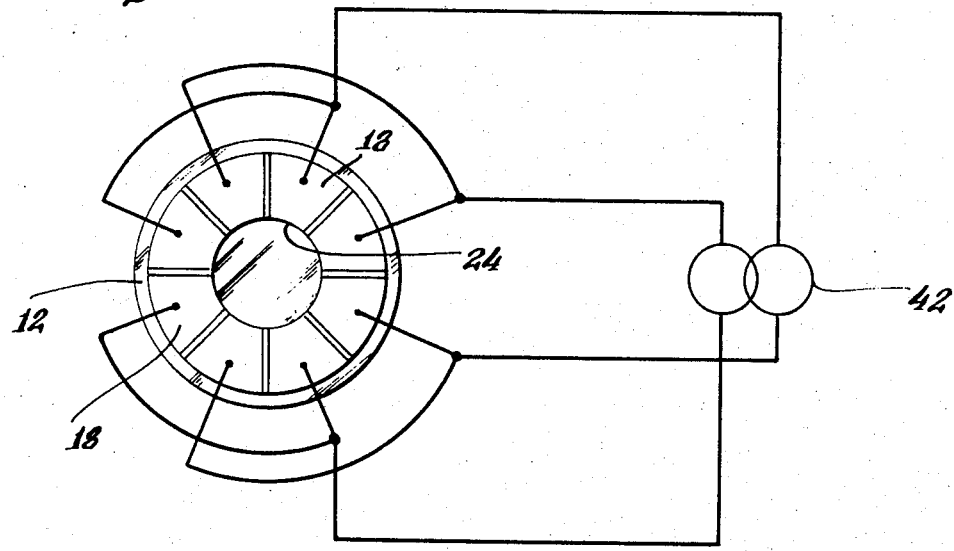
INVENTOR.
William R. Smith-Vaniz
BY
Frank J. Thompson
ATTORNEY.

INVENTOR.
William R. Smith-Vaniz
BY
Frank J. Thompson
ATTORNEY.

United States Patent Office 3,536,374
Patented Oct. 27, 1970

3,536,374
ELECTROMECHANICAL VARIABLE BIREFRINGENT LIGHT VALVE
William Reid Smith-Vaniz, Darien, Conn., assignor to The Perkin-Elmer Corporation, Norwalk, Conn., a corporation of New York
Filed July 18, 1966, Ser. No. 566,037
Int. Cl. G02f 1/24
U.S. Cl. 350—149                               8 Claims

ABSTRACT OF THE DISCLOSURE

An electro-mechanical transducer member is positioned on a surface of a body of optical quality glass which has a frequency ($f$) of natural mechanical resonance. The transducer is positioned in a manner for inducing mechanical stresses in the body upon excitation by an alternating voltage applied to the transducer. This transducer is formed by a plurality of segregated elements spaced in an annular configuration on the surface. The stresses cause the body to alternately exhibit an isotropic characteristic in each of several directions. With this arrangement, an electro-optic light valve is provided.

---

This invention relates to birefrigent devices and more particularly to devices wherein the birefringent characteristic of the device is variable.

Many optical system find advantageous use for a variable birefringent device. For example, in systems utilizing a laser as a light source, a polarizing optical chopper also known as an optical switch has been employed. The chopper functions as a periodically reversing quarter wave plate in which the phase relationships between the ordinary and extraordinary waves transversing the chopper are varied in some predetermined manner. Prior arrangements have utilized an electro-optical characteristic, which is exhibited by certain materials, as a mechanism for effecting variable birefringence. In general, these materials are piezoelectric and the application of an electric field directly to the material results in a molecular rearrangement of the crystal at the frequency of the applied electric field.

Several disadvantages attend the use of electro-optical birefringent devices which render this use in many applications undesirable. Particularly, the materials employed in such arrangements are strongly birefringent and demonstrate zero birefringence only along an optical axis of the material. In addition, the optical characteristics of the electro-optical arrangement is such that their ($f$) number is relatively poor and the device accordingly cannot be employed with a short focus lens. They are normally wide bandwidth devices and must be driven with a relatively large current.

It is an object of this invention to provide an improved variable birefringent optical arrangement.

Another object of the invention is to provide a variable birefringent optical arrangement which is excited with a relatively low drive current.

In accordance with a feature of the present invention, an electro-mechanical transducer member is positioned on a surface of a body of optical quality isotropic material which has a frequency ($f$) of natural mechanical resonance. The transducer is positioned in a manner for alternately inducing mechanical stresses in the body in at least two different directions upon excitation by an alternating voltage applied to the transducer. This stress causes the body to alternately exhibit an anisotropic characteristic in each of the directions. Circuit means excite the transducer at or relatively near the frequency ($f$). The body therefore acts as a birefringent material which provides differing transmission characteristics for the ordinary and extraordinary waves during a cycle of excitation. Through this arrangement, the natural resonance of the body is employed for establishing a relatively high mechanical Q and for enhancing vibration amplitude to thereby reduce the electrical drive requirement.

These and other features of the invention will be apparent with reference to the following specifications and drawings wherein:

FIG. 1 is an elevation view illustrating the physical arrangement of the stress-optical birefringent device of the present invention;

FIG. 2 is a side view, partially in section, of the device shown in FIG. 1;

FIG. 4 is a diagram illustrating an alternative arrangement of the device.

Figure 3:
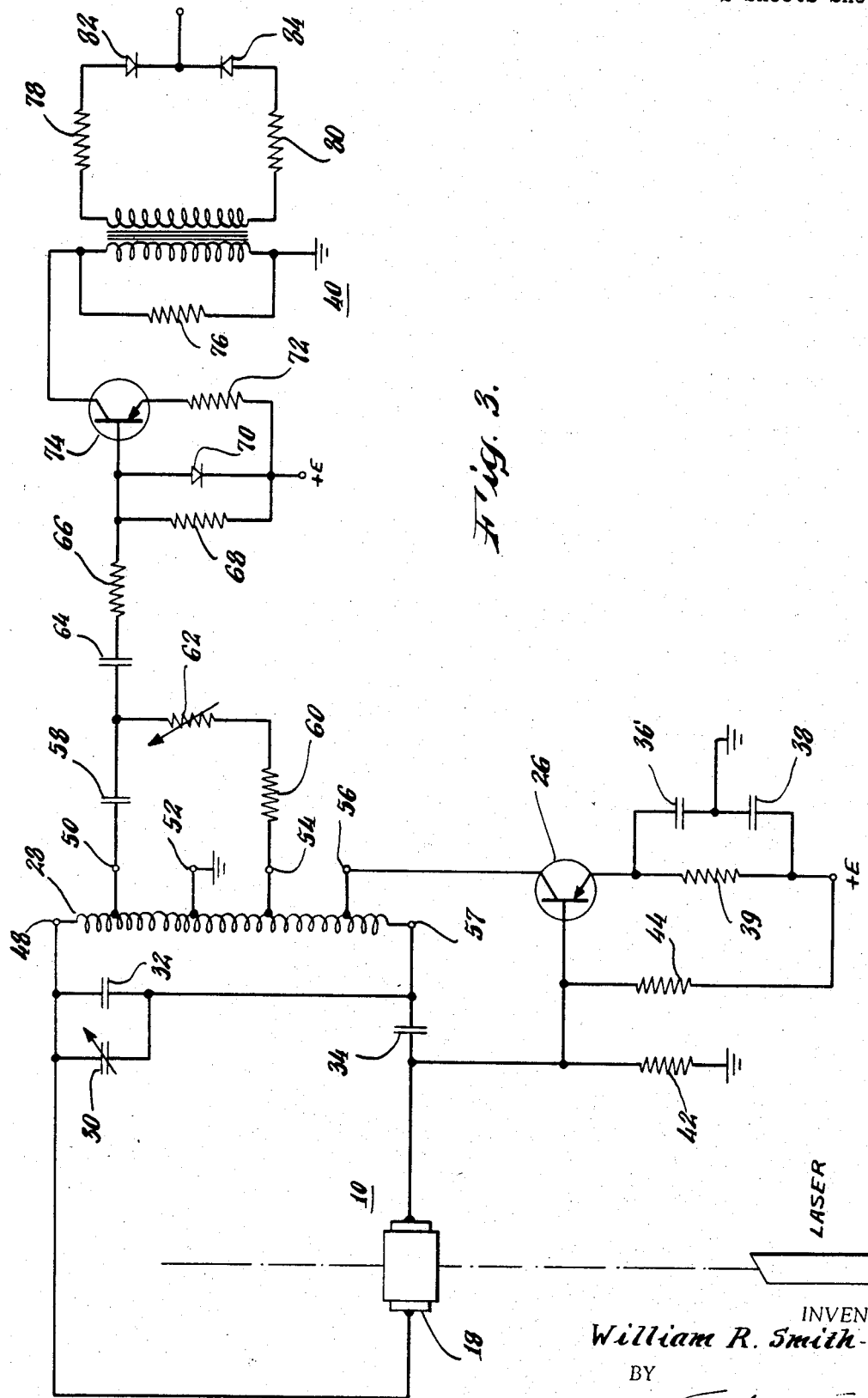
FIG. 3 is a circuit diagram illustrating an arrangement for exciting the device of FIG. 1.

Referring now to FIG. 1, a variable birefringent device, indicated generally as 10 is shown to include a body of optical quality isotropic material 12. The body 12 is shown to be formed as a parallelepiped from fused silica or other suitable type of optical quality glass. Typical dimensions of the body are 1 inch in length, ¾ inch in width and ⅜ inch in depth. An arrangement of this type will have a frequency ($f$) of natural resonance on the order of 110,000 cycles. The body is supported within an annular housing 14 by shock absorbent means shown to be Styrofoam support block 16. The body is thus adapted to vibrate freely with a minimum loss when excited.

An electro-mechanical transducer element 18 is formed into a strip and secured on a face of the body 12. In one form, the transducer comprises a ceramic piezoelectric cell. One typical cell is a clevite type Pzt-4. In preparation, the cell is divided into at least two insulated segments by etching and a relatively high D.C. Potentials (500 v.) of opposite polarity are applied momentarily to the segments for polarizing. In FIG. 1, terminal members 20 provide an electrically insulated standoff in a manner for connecting an external circuit, not shown, via leads 22 to the segments of the transducer member 18. The body 12, transducer element 18, and the Styrofoam support members 16 are secured together and to the housing 14 by any suitable epoxy glue applied to the mating surfaces.

Excitation of the transducer member 18 causes a corresponding vibration of this member and a corresponding vibration of the body 12. When this vibration is at or in the vicinity of the frequency ($f$) of natural resonance of the body 12, the vibration of the body 12 will be enhanced and its optical characteristics will vary as a result of the stresses occurring in the body. These stresses will be on the order of 500 p.s.i. More specifically, the axes of the orthogonally related ordinary and extraordinary light waves which are traversing the body are reorientated during one-half of an excitation cycle with respect to their orientation during a second half of the cycle. The body thus operates as a periodically reversing one-quarter wave plate. Desired optical effects are therefore performed on a light wave which passes through an apperture 24 in the housing 14 and through the body 12.

In FIG. 3, a circuit arrangement for exciting the device 10 is illustrated. The circuit comprises a capacitance bridge oscillator wherein the transducer 18 effectively operates as a capacitor in the bridge, the balancing arm being capacitor 34. The oscillator portion of this circuit includes transistor 26 and a tank circuit including an inductor 28 and capacitors 30, 32 and the capacity of transducer 18. The capacitors 36 and 38 function to bypass an emitter resistor 39. Various resistors are provided for establishing desired D.C. operating potentials at the electrodes of the transistor 26. The oscillation occurs at the mechanical resonant frequency because the bridge is electrically balanced, producing no positive feedback except through the piezoelectrically coupled motional impedance.

In order to synchronize the oscillations of the device 10 with other components of a system, an output signal is derived from the oscillator section and applied to a circuit indicated generally as 40 for generating an output clamping voltage.

In a particular arrangement of the circuit of FIG. 3, the following components which are not to be construed as limiting the invention in any way, were employed for exciting the chopper.

Transistors:
    26—2N2659
    74—2N1305
Diodes:
    70—In458
    82, 84—In270
Winding of inductor 28:
    55 turns between terminals 48 and 50
    10 turns between terminals 50 and 52
    10 turns between terminals 52 and 54
    15 turns between terminals 54 and 56
    40 turns between terminals 56 and 57
Core—D131032-4
Resistors:
    42—1.5K ohms
    44—150 ohms
    46—27 ohms
    60—100 ohms
    62—5K ohms (adjustable)
    66—2.2K ohms
    68—3.3K ohms
    72—68 ohms
    76—2.2K ohms
    78—1K ohm
    80—1K ohm
Capacitors:
    32—1500 $\mu\mu$f.
    34—2000 $\mu\mu$f.
    36—.1 $\mu$f.
    38—.1 $\mu$f.
    58—3300 $\mu\mu$f.
    64—.01 $\mu$f.
$E = +12$ v.

An alternative arrangement for exciting the body 12 is illustrated symbolically in FIG. 4. The body 12 in FIG. 4 is cylindrically shaped and the piezoelectric transducer is arranged in an annular fashion on one face of the body. The transducer is divided into arcuate segments and is arranged to be excited by a two-phase alternating current provided by the generator 42. Thus, more than two axes for the ordinary and extraordinary wave traversing the body 12 can be provided to suit the particular function desired.

While I have illustrated and described particular embodiments of my invention, it will be understood that various modifications may be made therein without departing from the spirit of the invention and the scope of the appended claims.

I claim:
1. A variable birefringent optical arrangement comprising:
    a body of optical quality isotropic material having a frequency ($f$) of natural resonance, said body having a surface thereof normal to the direction of an impinging beam of light,
    an electro-mechanical transducer mounted on said body surface in a manner for causing said body to vibrate when said transducer is excited, said transducer comprising a plurality of segregated elements spaced in an annular configuration about said surface, and
    an alternating current generator coupled to said transducer in a manner for applying an exciting current of frequency ($f$) to said transducer.

2. The arrangement of claim 1 wherein said transducer comprises a disk positioned on said body surface and divided into a plurality of segregated segments.

3. The birefringent arrangement of claim 1 wherein said body of optical quality of material comprises optical quality glass and said transducer comprises a piezoelectric transducer.

4. The arrangement of claim 3 wherein said transducer comprises a ceramic piezoelectric material.

5. The arrangement of claim 3 wherein said generator comprises an oscillator circuit having a frequency determining circuit including said body and said piezoelectric transducer.

6. The variable birefringent arrangement of claim 1 including
    a housing having an aperture formed therein and,
    means supporting said body in said housing in a manner for providing an unobstructed passage through said aperture and said body for a beam of light.

7. The arrangement of claim 6 wherein said support means comprises a shock-absorbent material of relatively low density.

8. The arrangement of claim 1 wherein said transducer includes an array of segment pairs wherein each segment of a pair is positioned diagonally opposite the other on said surface, said array is adapted for having applied thereto phase differing alternating voltages, and said alternating current generator comprises a multiphase generator for applying to said array phase differing alternating voltages.

References Cited
UNITED STATES PATENTS

| | | | |
|---|---|---|---|
| 2,024,737 | 12/1935 | Klingsporn | 350—150 |
| 2,064,289 | 12/1936 | Cady | 350—149 X |
| 2,623,165 | 12/1952 | Mueller et al. | 350—149 X |
| 3,111,666 | 11/1963 | Wilmotte | 350—149 X |
| 3,379,887 | 4/1968 | Stephany | 350—149 X |

DAVID SCHONBERG, Primary Examiner

P. R. MILLER, Assistant Examiner

U.S. Cl. X.R.
350—150, 157